Patented Oct. 17, 1939

2,176,153

UNITED STATES PATENT OFFICE 2,176,153

METHOD OF STRESS-RELIEVING PLASTICS

Waldo L. Semon, Silver Lake Village, Ohio, assignor to The B. F. Goodrich Company, New York, N. Y., a corporation of New York No Drawing. Application December 7, 1937, Serial No. 178,569

3 Claims. (Cl. 18—48)

It is well known that many plastic materials, when forced into continuous lengths by such means as calendering or extruding, exhibit a pronounced grain or calender-effect, which manifests itself in an abnormally small extensibility in the direction of length. This effect is generally considered to be caused at least in part by the fact that the plastic is shaped at somewhat elevated temperatures, and is of necessity deformed in the shaping process so that at the instant in which it acquires its final shape it is considerably stressed, and is then more or less suddenly chilled by contact with a cold surface or with the atmosphere so that further change in shape is prevented or greatly retarded.

This calender effect is undesirable for a number of reasons. The extensibility in direction of length is considerably diminished, which is a serious matter when a material of high extensibility is desired. The sheet shows an abnormally low resistance to tear in one direction or the other depending upon the material. Any sheet having a calender grain has a constant tendency to relieve its internal stresses by shrinking in the direction of the grain, which may occur slowly at ordinary temperatures or very rapidly if the temperature is elevated. If change in shape is prevented, the material will exert large stresses on the restraining structure.

It has been common practice to relieve the internal stresses produced by calendering or extruding such plastic materials as rubber, by maintaining the material at a suitable high temperature for a sufficient length of time to permit the internal stresses to relieve themselves. This may be done either by maintaining the material at a high temperature as it leaves the shaping device, or if that is not convenient, by reheating it later. The material ordinarily shrinks in length, with a corresponding increase in the other dimensions, although it is possible to relieve the stresses without any change in dimensions, if shrinkage is mechanically prevented while the material is heated above the temperature at which it becomes plastic.

Prior means for relieving the internal stresses produced by calendering or the like have not been completely satisfactory in that excessive time has been required, so that the process could not be carried out continuously, and in that the unavoidable contact of the material with its supports has prevented uniform shrinkage and led to irregularities in shape. Such disadvantages have been tolerable in materials such as rubber which required a finishing operation such as vulcanization in a mold, but are intolerable in a material designed to be used directly as it comes from the calender or other shaping machine.

Thus, the rubber-like, resilient material produced by plasticizing gamma polyvinyl chloride at a high temperature with say from one third to one times its weight of a suitable plasticizer and then cooling, may be calendered, extruded or otherwise shaped at temperatures in the neighborhood of 100°–150° C., but when so shaped, exhibits a pronounced grain, and in fact is hardly extensible in the direction of length although it otherwise has the feel and resilience of high grade soft rubber. When warmed, it shrinks at a rate dependent on temperature, and if there are even slight irregularities in temperature the shrinkage is not uniform and serious warping and buckling occur. When this material is used as it comes from the calender for helical wrapping with heat-sealing of adjacent helical convolutions, the irregular stresses produced by the heat-sealing, together with the tension necessary for helical wrapping, sometimes exceed the strength of the material producing disastrous failures. On the other hand, previously known means for relieving the stresses by heating before it is used, produce such irregularities in shape as to make the material unusable.

I have discovered that internal stresses in plastic materials can be relieved in an absolutely uniform manner by floating the materials on a heated liquid surface. The liquid may be any liquid which does not have a destructive effect on the material and which has a conveniently high boiling point, and preferably density high enough to float the material. It is preferably a liquid of high heat conductivity which does not wet the material used. It is evident, therefore, that the nature of the liquid used will depend to some extent on the nature of the plastic material.

Materials such as rubber and the plasticized polyvinyl chloride referred to above are not appreciably affected by contact with glycerol, hence may be floated across the surface of a glycerol bath heated to about 150° C. The glycerol in this case wets the material sufficiently so that a film of the liquid is carried away on the surface of the material, but it may conveniently be removed by washing with water or alcohol and drying. Other organic liquids may obviously be used, or aqueous solutions of organic or inorganic materials such as concentrated sugar or salt solutions, or baths of fused salts such as alum, calcium chloride (hydrated) or lead acetate, or fusible metals such as Wood's metal.

The liquid which I prefer to use is metallic mercury. Mercury has an extremely high surface tension and does not wet ordinary organic materials. It is stable and has a very low vapor pressure, so that losses by evaporation are negligible. It has a high density so that it will float even compositions considerably heavier than water.

As a specific example of a preferred embodiment of my invention, the gamma polymer of vinyl chloride is plasticized with half its weight of tricresyl phosphate and is calendered at about 120° C. to a sheet about 1 mm. thick. The sheet as it leaves the calender is led across the surface of a pool of mercury maintained at a temperature of 150° C. so that it is in contact with the heated liquid for about one second. In this interval the calendered sheet shrinks to about two-thirds its original length, and increases in thickness. The sheet formed by the calendering process usually has a matt surface. As this passes over the heated mercury it acquires a high gloss. If the sheet is turned over and the other side is treated in a similar manner, both sides will be made glossy and the sheet will accordingly be clear and transparent. The sheet is allowed to cool as it leaves the heated liquid surface, and regardless of whether one side or both have been treated, the material is substantially free from calender grain and furthermore is perfectly smooth and free from irregularities in shape.

It is evident that the invention is susceptible of numerous modifications, and that many materials other than those hereinabove described may be similarly treated, including the various types of materials ordinarily characterized as "synthetic rubber", as well as materials which exhibit elastic properties only at temperatures higher than room temperature, such as polymerized styrene and some of the polyacrylic esters, hence it is not intended to limit its scope except in acccordance with the appended claims.

I claim:

1. The method of producing a thermoplastic sheet substantially free from grain which comprises calendering a thermoplastic material to produce a sheet, and floating the sheet across the surface of a liquid which does not have a destructive effect on the material, which liquid is heated to a temperature at which the material is plasic.

2. The method of producing a thermoplastic sheet substantially free from grain which comprises calendering a thermoplastic material to produce a sheet, and floating the sheet across the surface of a pool of mercury heated to a temperature at which the material is plastic.

3. The method of producing a sheet of plasticized gamma polyvinyl chloride substantially free from grain which comprises calendering plasticized gamma polyvinyl chloride to produce a sheet, and floating the sheet across the surface of a pool of mercury heated to a temperature of about 150° C.

WALDO L. SEMON.